US008185304B2

(12) United States Patent
Insolia et al.

(10) Patent No.: US 8,185,304 B2

(45) Date of Patent: May 22, 2012

(54) METHOD, COMPUTER PROGRAM AND SYSTEM FOR OPTIMISING ROUTES PROVIDED BY NAVIGATION SYSTEMS

(75) Inventors: Nina Insolia, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/113,584

(22) Filed: May 1, 2008

(65) Prior Publication Data

US 2009/0326798 A1 Dec. 31, 2009

(30) Foreign Application Priority Data

May 2, 2007 (EP) .................................... 07107366

(51) Int. Cl.

*G06F 17/00* (2006.01)
*G01C 21/00* (2006.01)
*G01C 21/34* (2006.01)
*G08G 1/09* (2006.01)

(52) U.S. Cl. ........ 701/410; 701/411; 701/418; 701/424; 340/995.1; 340/995.13; 340/995.21

(58) Field of Classification Search .................. 701/200, 701/201, 205, 207, 208, 209, 210, 213, 117, 701/400, 408, 409, 410, 411, 414, 417, 418, 701/424, 466; 340/988, 995.1, 995.13, 995.14, 340/995.19, 995.2, 995.21; 342/357.01, 342/357.06, 357.13

See application file for complete search history.

(56) References Cited

U.S. PATENT DOCUMENTS

| | | | | |
|---|---|---|---|---|
| 5,610,821 | A * | 3/1997 | Gazis et al. | 455/456.5 |
| 7,742,873 | B2 * | 6/2010 | Agnew et al. | 701/209 |
| 2004/0073361 | A1 * | 4/2004 | Tzamaloukas et al. | 701/210 |
| 2006/0149461 | A1 * | 7/2006 | Rowley et al. | 701/202 |
| 2008/0234921 | A1 * | 9/2008 | Groenhuijzen et al. | 701/118 |

* cited by examiner

*Primary Examiner* — Jack W Keith
*Assistant Examiner* — Edward Pipala
(74) *Attorney, Agent, or Firm* — Garg Law Firm, PLLC; Rakesh Garg; Jeffrey S. LaBaw

(57) ABSTRACT

A method of controlling a navigation system is provided which builds up historical information of routes taken by a vehicle and uses this information to provide an appropriate route for the vehicle based upon deviations from suggested routes stored upon a mobile computer unit of the navigation system of the vehicle.

19 Claims, 5 Drawing Sheets

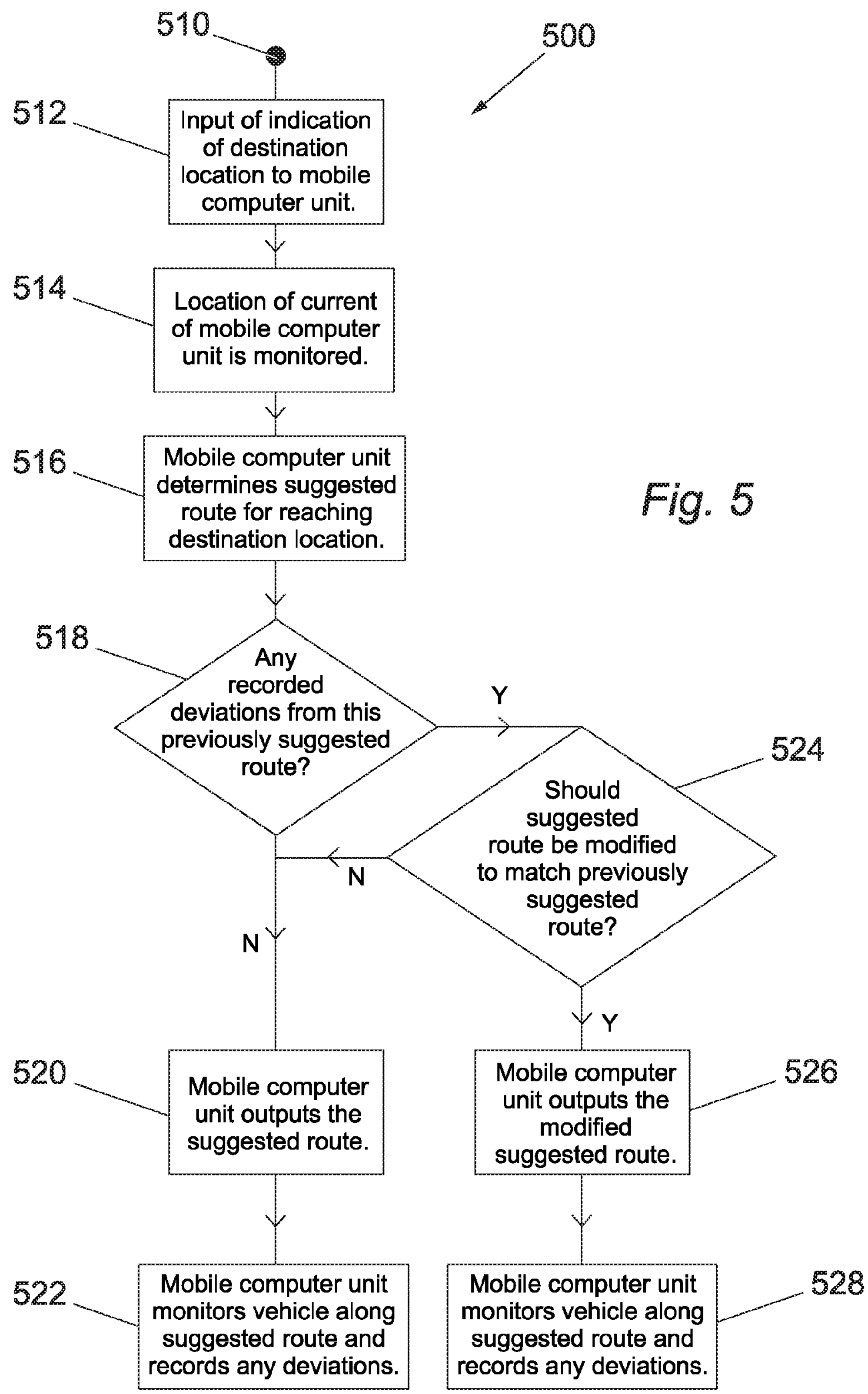
510
500
512
Input of indication of destination location to mobile computer unit.
514
Location of current of mobile computer unit is monitored.
516
Mobile computer unit determines suggested route for reaching destination location.
Fig. 5
518
Any recorded deviations from this previously suggested route?
Y
524
Should suggested route be modified to match previously suggested route?
N
N
Y
520
Mobile computer unit outputs the suggested route.
Mobile computer unit outputs the modified suggested route.
526
522
Mobile computer unit monitors vehicle along suggested route and records any deviations.
Mobile computer unit monitors vehicle along suggested route and records any deviations.
528

METHOD, COMPUTER PROGRAM AND SYSTEM FOR OPTIMISING ROUTES PROVIDED BY NAVIGATION SYSTEMS

FIELD OF THE INVENTION

The present invention relates to the information technology field. More specifically, the invention relates to navigation systems.

BACKGROUND ART

Navigation systems have become increasingly popular in recent years. A navigation system consists of a small electronic device that aids a driver of a vehicle to reach a desired destination. Navigation systems are particularly useful for people visiting areas they are not familiar with.

Navigation systems operate by knowing where the navigation unit is positioned by using Global Positioning Satellites (GPS) and by applying that position to a context provided by a map and by a desired destination. The navigation system can then suggest how the driver of a vehicle (for example) should act (e.g. turn right in 500 metres) to get to the desired destination according to possible route alternatives (defined in the map) and personal preferences (e.g. avoiding motorways).

The context can be augmented using additional information such as broadcasts of traffic information (traffic jams on certain routes). U.S. Pat. No. 5,610,821 discloses a system for determining optimal vehicle routes using current traffic flow information. The system receives current traffic flow information from a number of individual vehicles and uses this information to identify when a traffic flow problem exists. Once the system has identified that a traffic problem exists, it re-calculates a new route based on the information received from the vehicles. The system therefore continuously monitors the traffic flow of a road network and provides alternative routes when traffic flow problems are identified.

The system of U.S. Pat. No. 5,610,821 relies upon receiving dynamic feedback traffic flow information from the individual vehicles, but often local knowledge is the only way to choose one route over another in terms of efficiency. Local knowledge, for example, could be that cars often double-park on a particular street, reducing its effective width, road conditions, such as potholes, and so on.

Navigation systems exist which are capable of gathering historical information concerning routes taken by a number of individual vehicles. Such systems rely on a central database to analyse and store the historical information of all the participating vehicles. The central database can therefore suggest an improved route to a vehicle based on the analysis of the information gathered from the participating vehicles. However, such systems are often troublesome and costly to administrate. Furthermore, as the central database analyses historical information received from a number of different types of vehicles (e.g. delivery trucks, taxis, motorbikes etc.), the routes suggested by the system are often inappropriate for a specific type of vehicle. For example, a route which is appropriate for a motorbike is often not appropriate for a truck, and vice versa.

Navigation systems, such as those discussed above, are therefore limited in that they are expensive to administrate and often cannot suggest the optimal route to the driver of a specific type vehicle.

SUMMARY OF THE INVENTION

According to the present invention there is provided a method of controlling a navigation system. The method including the steps of: inputting an indication of a destination location to a mobile computer unit; monitoring the current location of the mobile computer unit; outputting a suggested route for reaching the destination location from the current location along a route selected on a predefined map, wherein the suggested route is determined by the mobile computer unit and takes into consideration traffic data stored on the mobile computer unit; monitoring deviations from the suggested route; and using the monitored deviations to improve the traffic data stored on the mobile computer unit.

Another aspect of the present invention provides a computer program for performing the above-described method.

A still further aspect of the present invention provides a system including means for performing the steps of the above-described method.

A still further aspect of the present invention provides mobile computer unit for a navigation system, the mobile computer unit comprising: means for inputting an indication of a destination location to the mobile computer unit; means for storing traffic data; means for calculating a suggested route for reaching the destination location from a current location along a route selected on a predefined map, wherein the suggested route is calculated by the mobile computer unit and takes into consideration traffic data stored on the mobile computer unit; means for outputting the suggested route; means for monitoring deviations from the suggested route; means for improving the traffic data using the monitored deviations.

Further embodiments of the invention are provided in the appended dependent claims.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which:

FIG. 5 shows a diagram describing the flow of activities relating to an illustrative implementation of the method.

DETAILED DESCRIPTION

Figure 1:
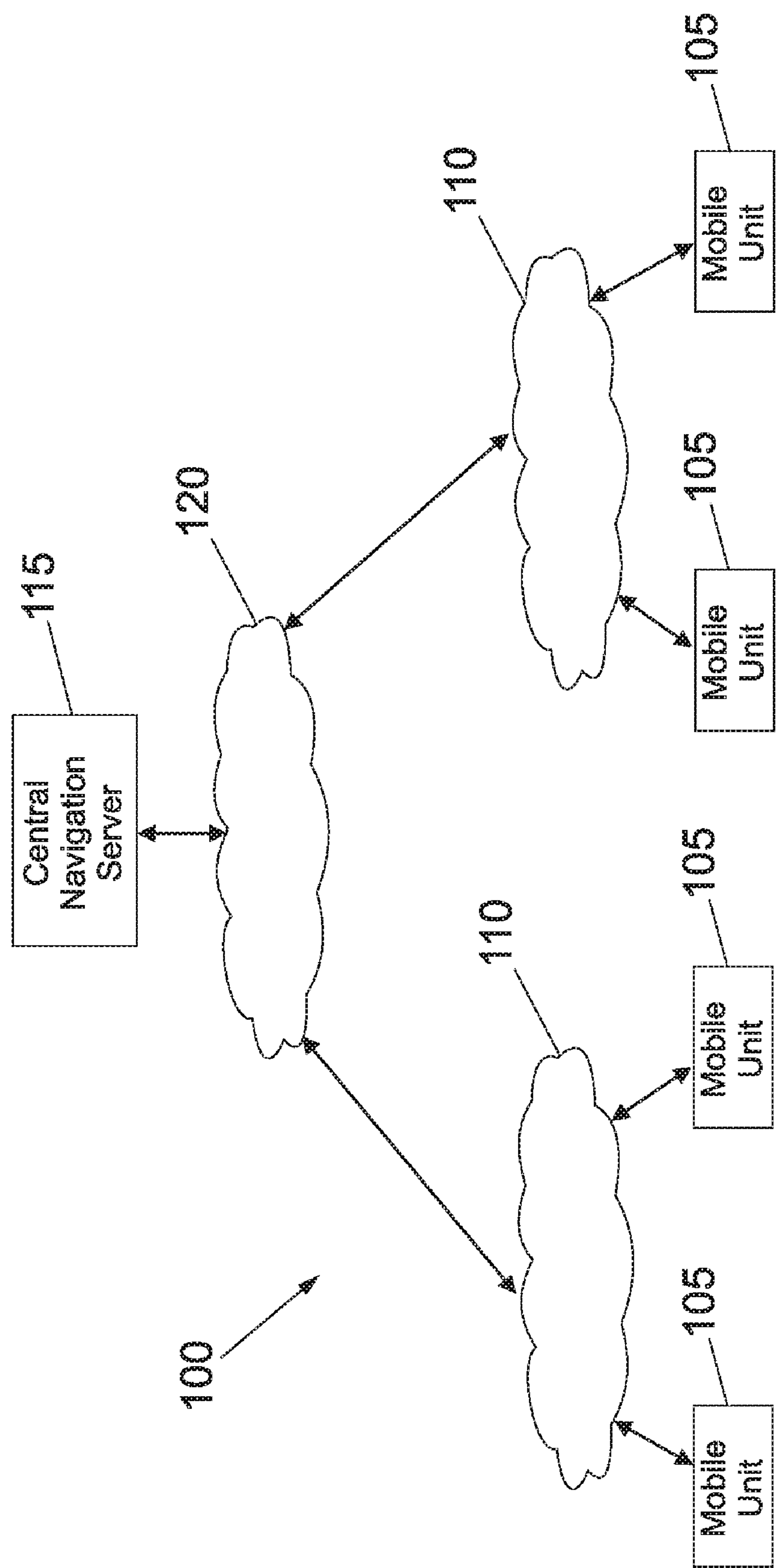
FIG. 1 is a schematic block diagram of a data processing system in which the method of the invention is applicable.

With reference in particular to FIG. 1, a data processing system 100 with distributed architecture implementing a Navigation System, is depicted. The system 100 includes multiple endpoints 105, which are grouped into different sets. The endpoints 105 can be mobile units, vehicle units and more generally any kind of data processing system capable of receiving signal from the Central Navigation Server. The endpoints 105 are connected to the Central Navigation Server 115 through wireless networks 110-120 (for example, a GPS or GSM networks). The Central Navigation Server 115 maintains a repository where traffic data maps and routes are collected and managed.

Figure 2:
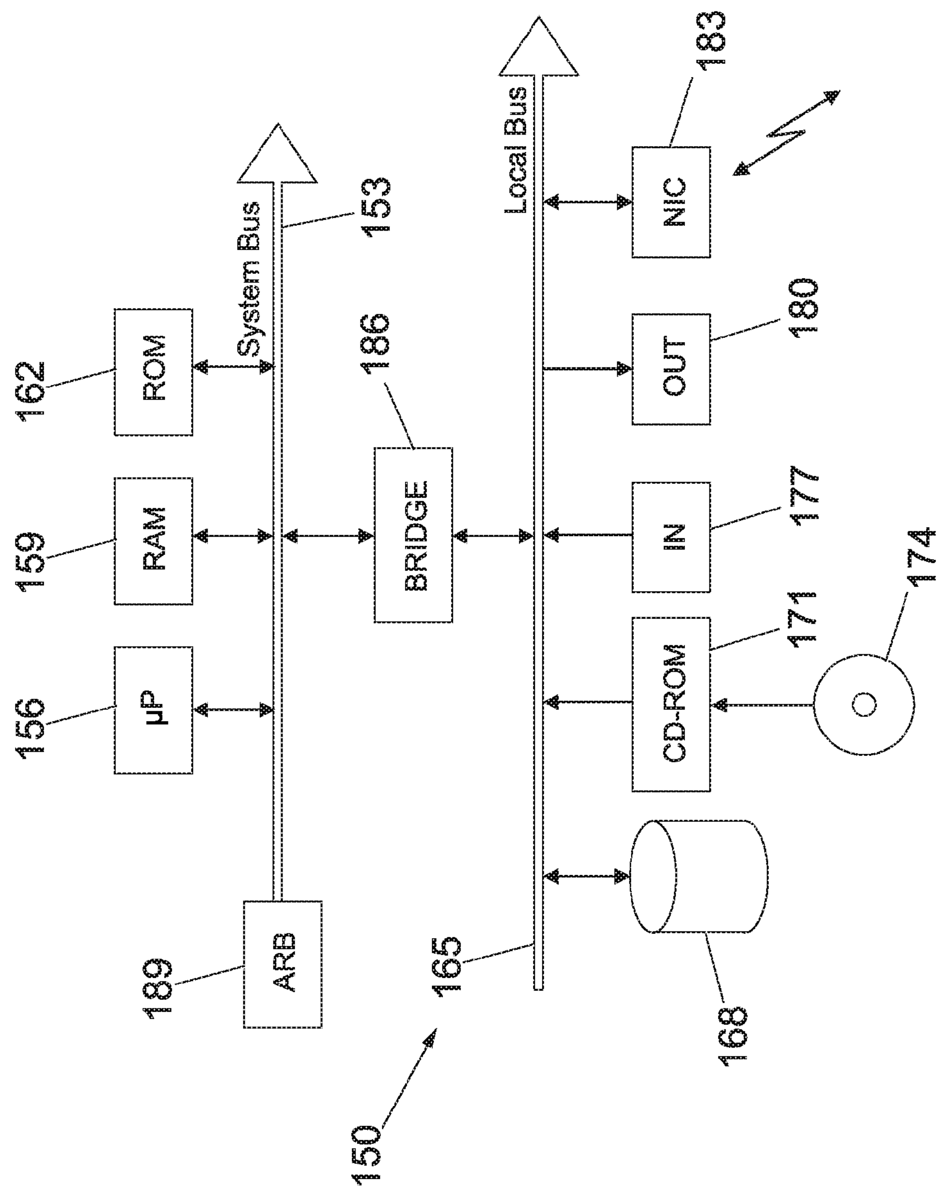
FIG. 2 shows the functional blocks of a generic computer system.

As shown in FIG. 2, a generic computer of the system (e.g. mobile computer unit, central server, router, transmitter) is denoted with 150. The computer 150 is formed by several units that are connected in parallel to a system bus 153. In detail, one or more microprocessors (mP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized, or even in a stand-alone computer. For example, in a in-vehicle satellite navigation system or a hand-held satellite navigation system.

Figure 3:
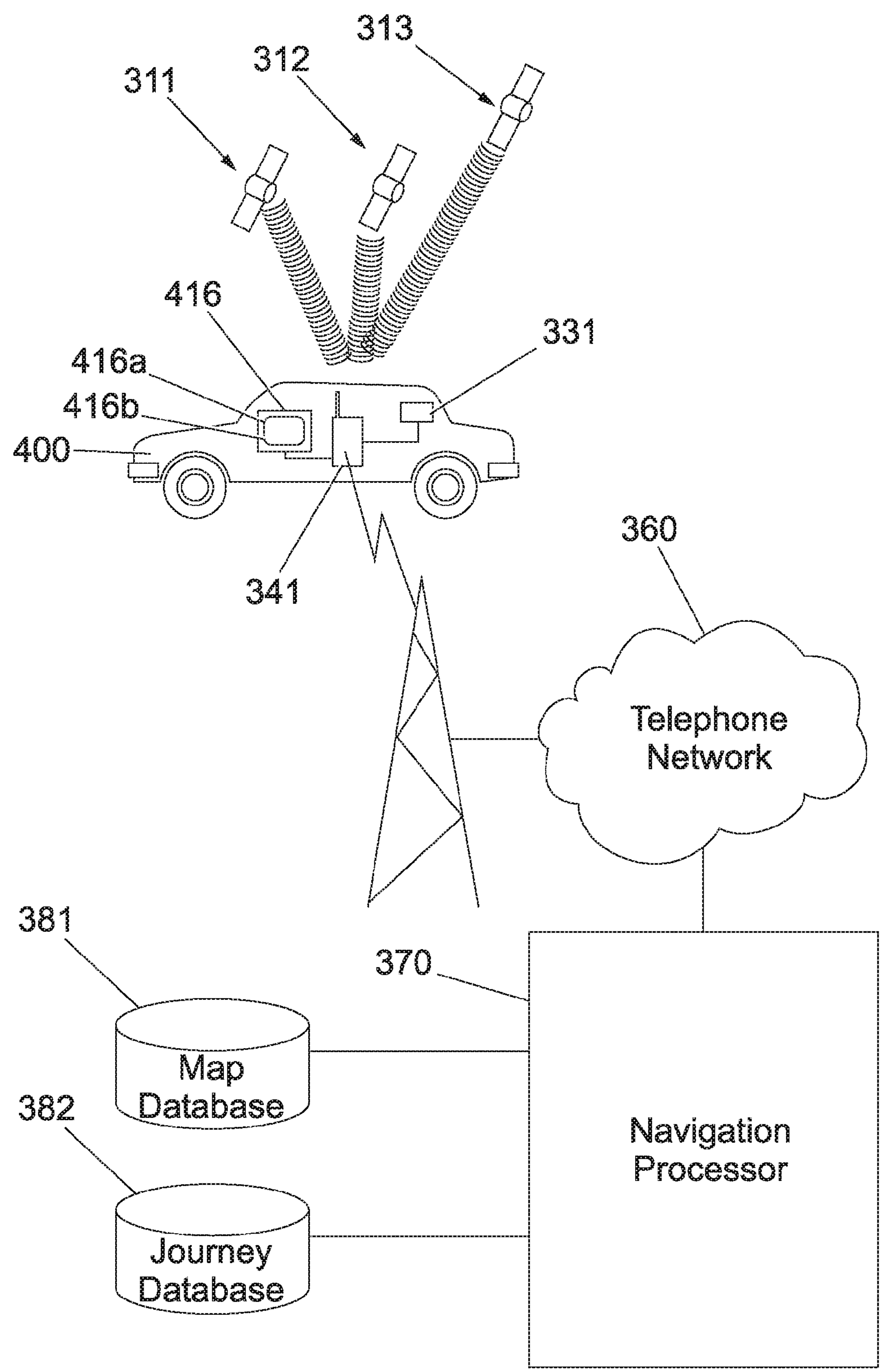
FIG. 3 shows a system suitable for implementing the present invention.

FIG. 3 shows a system suitable for implementing the present invention. As shown in FIG. 3, there is provided a constellation of navigation satellites 311, 312 and 313 belonging for example to the GPS or Galileo systems. There is further provided a vehicle 400 carrying a navigation system 416. The navigation system includes a mobile computer unit 416*a* which includes a user interface unit 416*b*, a satellite positioning receiver 331 and cellular communication device 341. The satellite positioning receiver 331 receives timing data transmitted by the navigation satellites 311, 312 and 313 and thereby determines the instantaneous position of the vehicle 400 in which it is located. There is further provided a cellular telephone network 360, which is capable of bi-directional communication with the cellular communication device 341. There is further provided a navigation processor 370, connected to the cellular telephone network 360 as well as a map database 381 and a journey database 382.

The system typically works by a user in the vehicle 400 entering a request for navigation information to a particular destination into the vehicle's mobile computer unit 416*a*. The satellite positioning receiver 331 processes signals received from the navigation satellites 311, 312 and 313 so as to determine the position of the vehicle 400. The cellular communication device 341 is used to transmit the request data from the mobile computer unit 416*a* and the position data from the satellite positioning receiver 331 to the navigation processor 370 by means of the cellular telephone network 360. On receiving at least a present position and destination information, the navigation processor 370 implements a routing algorithm with reference to the map database 381 so as to determine a preferred route between the present position of the vehicle 400 and the destination. This route may be added to a central journey database 382.

When a large number of vehicles of different types submit similar journey information to a navigation system having a central database, the improved route suggested the system is often inappropriate for a specific type of vehicle. For example, if the journey information submitted to the system comes mainly from motorbikes, then the improved route suggested by the system may not be appropriate for trucks.

Thus according to the present invention, a method of controlling a navigation system is provided which provides optimal route suggestions to specific vehicles.

In the following example a journey is described between one node and another, by convention the journey starts at the first node mentioned and terminates at the second. Obviously, the journey as described may form parts of larger journeys.

Figure 4:
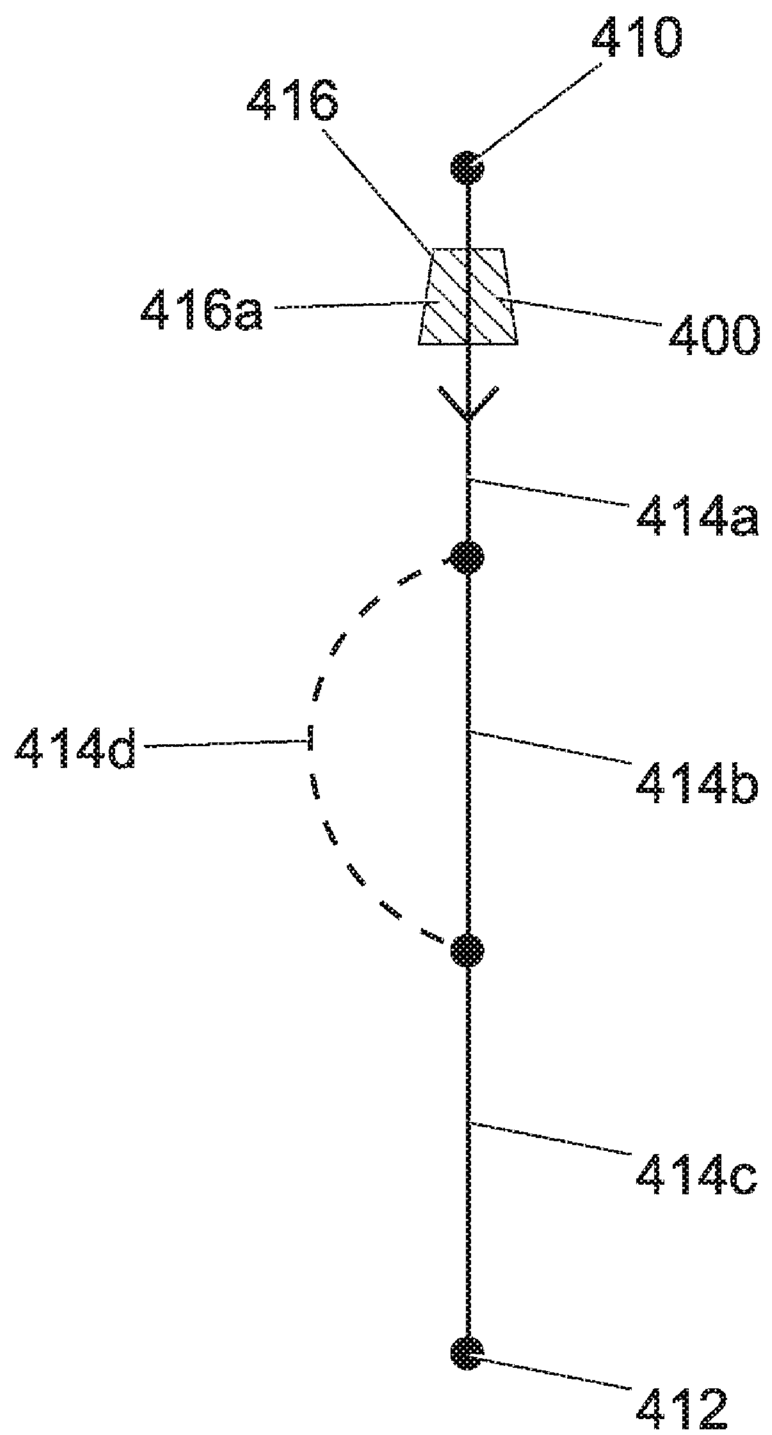
FIG. 4 shows exemplary applications of the solution according to an embodiment of the invention.

FIG. 4 exemplifies an embodiment of the invention. In FIG. 4 there is shown a road network within which the vehicle 400 is travelling. The network comprises a starting node 410, a finishing node 412 and a plurality of roads 414*a*-414*d*. The starting node 410 defines the starting point of the journey and the finishing node 412 defines the finishing point of the journey.

As illustrated in FIG. 4, the vehicle 400 has requested navigation information from the starting node 410 to the finishing node 412. The computer unit 416*a* performs a calculation in order to determine the optimal route for the vehicle 400. The computer unit 416*a* typically tries to determine the quickest route from starting node 410 to finishing node 412 and suggests this as the optimal route for the vehicle 400. However, the computer unit 416*a* is also adapted to take into consideration predetermined user preferences when determining the optimal route for the vehicle 400, e.g. avoid motorways etc.

As illustrated in FIG. 4, the computer unit 416*a* has suggested that the vehicle 400 takes roads 414*a* then 414*b* and then 414*c* as the optimal route to get from starting node 410 to finishing node 412.

During the journey, the computer unit 416*a* continuously monitors the location of the vehicle 400 and records any deviations which the vehicle 400 takes from the suggested route. For example, in the present example illustrated in FIG. 4, although the computer unit 416*a* has suggested taking roads 414*a*, 414*b* and 414*c*, the computer unit 416*a* notes that the vehicle actually takes roads 414*a*, 414*d* and 414*c* in order to get from starting node 410 to finish node 412. The noted deviation is stored on the mobile computer unit 416*a*.

The vehicle 400 may deviate from the suggested route because the driver has a local knowledge of the area. Local knowledge could be that cars often double-park on a particular street thus reducing its width, road conditions such as potholes etc. Also, depending on the type of vehicle being driven, e.g. motorbike, truck etc., the driver may exercise this local knowledge to avoid certain roads.

For each repeated journey, i.e. each time the vehicle 400 requests navigation information from starting node 410 to finishing node 412, the computer unit 416*a* notes any deviations from the suggested route and stores them in its internal memory. In this way the mobile computer unit 416*a* gathers historical information on the actual route taken by the vehicle 400 instead of the originally suggested route.

Once the computer unit 416*a* builds up a sufficient body of historical information about the journey from starting node 410 to finish node 412, it then begins to take into consideration the deviations from the suggested route when determining the suggested route.

For example, the computer unit 416*a* compares the number or times a deviation from the suggested route was taken with the number of times the suggested route was taken. If the number of times a deviation from the suggested route is at least 85% then the computer unit 416*a* can give an option of taking the originally suggested route, or taking the deviation from this route. In this way the vehicle 400 knows that there is an alternative option to the originally suggested route. The computer unit 416*a* may present the alternative route to the user of the vehicle 400 as a route which has been taken more commonly than the original suggested route.

Alternatively, once the computer unit 416*a* has determined that the ratio between the number of times a deviation from the suggested route is taken and the number of times the suggested route was taken satisfies a predetermined criteria, the computer 416*a* may consider this deviated route to be the optimal route and modify the originally suggested route to match the newly determined optimal route. In this way, the computer unit 416*a* always presents the optimal route as the suggested route for the vehicle 400.

In this way the computer unit 416*a* can determine an optimal route based on local knowledge of the area. It should be appreciated that the computer unit 416*a* can continuously compare any deviations from suggested routes and present alternative routes for the vehicle 400 or modify original routes to match newly determined routes.

With reference to FIG. 5, the logic flow of controlling the navigation system according to an embodiment of the invention is illustrated with a method 500. The method begins at the black start circle 510. Continuing to block 512 an indication of a destination location is input to the mobile computer unit 416*a*. At step 514 the current location of the mobile computer unit 416*a* is monitored. At step 516 the computer unit 416*a* determines a suggested route for reaching the destination location from the current location along a route selected on a predefined map. At step 518 the computer unit 416*a* checks to see if there are any recorded deviations from this previously suggested route. If there are no recorded deviations from this previously suggested route, the method moves on to step 520 where the computer unit 416*a* outputs the suggested route. At step 522 the computer unit 416*a* monitors the vehicle along the suggested route and records any deviations from the suggested route. The mobile computer unit 416*a* stores any deviations from the suggested route thereon for future use. If there are recorded deviations from this previously suggested route, the method moves on to step 524 where the computer 416*a* considers whether the suggested route should be modified to match a previously deviated route. If the computer unit 416*a* considers that the suggested route should not be modified the method moves to step 520. If the computer unit 416*a* considers that the suggested route should be modified the method moves to step 526 where the computer unit 416*a* outputs the modified suggested route. At step 528 the computer unit 416*a* monitors the vehicle along the modified suggested route and records any deviations from the modified suggested route. The mobile computer unit 416*a* stores any deviations from the modified suggested route thereon for future use.

Although only one particular journey has been illustrated and described here, it should be appreciated that the mobile computer unit 416*a* can monitor deviations from a plurality of repeated journeys and determine optimal routes for each one based on gathered local knowledge.

The navigation system 416 of the present invention is intended to build up historical information of optimal routes of individual vehicles based on deviations from originally suggested routes. The navigation system 416 is intended to gather local knowledge of the optimal routes for the particular vehicle and to provide these optimal routes as alternatives to the user of the vehicle, or to modify original routes based on the recorded deviations. As the optimal routes are particular the vehicle in which the navigation system 416 is fitted, the problem of getting an inappropriate route is avoided.

The navigation system 416 is particularly suited for use in commercial vehicles such as delivery trucks, taxis etc. where the vehicle is often a local vehicle but the driver is not familiar with the area. In this instance the navigation system 416 is able to provide the driver of the vehicle with optimal routes for journeys around the area.

The navigation system 416 is a relatively inexpensive item which can be easily installed and maintained in a large number of vehicles.

It should also be appreciated that the mobile computer unit 416*a* may store a number of deviations from the suggested route, i.e. a number of fragments of a complete route. In this manner the complete route taken need not be stored, but rather only any deviations from the suggested route.

Furthermore, the decision the mobile computer unit 416*a* makes concerning when to modify the originally suggested route is based on a 'policy' defined within the system/user preferences. For example, if the same deviation is noted in over 25% of route fragment navigation, or if the same deviation is noted in five successive journeys, the mobile computer unit 416*a* will modify the originally suggested route to incorporate the previously recorded deviations therein.

Although the navigation system 416 has been described above as being used in a vehicle 400, it should be appreciated that the navigation system 416 could be a hand-held unit.

Although the threshold for considering a deviated route to be the optimal route has been described above as approximately 85%, it should be appreciated that the navigation system 416 can be completely customizable set any desired threshold value. Also, instead of the threshold for considering a deviated route to be an optimal route being a ratio between deviated routes and suggested routed, the navigation system 416 may be configured to consider a deviated route to be the optimal route once the number of times the deviated route has been taken has reached a predetermined value.

While the invention has been particularly shown and described with reference to a preferred embodiment, it will be understood that various changes in form and detail may be made therein without departing from the spirit, and scope of the invention.

The invention claimed is:

1. A method of controlling a navigation system comprising:

inputting an indication of a destination location to a mobile computer unit;

monitoring the current location of the mobile computer unit;

outputting a suggested route for reaching the destination location from the current location along a route selected on a predefined map, wherein the suggested route is determined by the mobile computer unit and takes into consideration traffic data stored on the mobile computer unit;

monitoring at the mobile computer unit, deviations from the suggested route;

building in the mobile computer unit, a repository of historical information about the deviations; and using the historical information about the deviations in the mobile computer unit to improve the traffic data stored on the mobile computer unit.

2. The method according to claim 1, wherein the determination of the suggested route includes comparing the number of times a deviation from the suggested route was taken with the number of times the suggested route was taken.

3. The method according to claim 2, wherein the traffic data stored on the mobile computer unit is updated when the number of times a deviation from the suggested route was taken exceeds a predetermined threshold.

4. The method according to claim 1, wherein the step of outputting the suggested route for reaching the destination location includes the additional step of considering one or more predetermined user preferences.

5. The method according to claim 1, further comprising:

providing, responsive to a number of the deviations in historical information exceeding a threshold, an alternative route that includes the deviation from the suggested route; and allowing a selection between the alternative route and the suggested route.

6. The method of claim 1, wherein the mobile computer unit is coupled with a vehicle, wherein the suggested route is further determined by taking into consideration that traffic data stored on the mobile computer unit which is relevant to a type of the vehicle, and wherein using the historical information about the deviations improves the traffic data stored on the mobile computer unit for the type of the vehicle.

7. A computer program product comprising a computer usable storage medium including computer usable code for performing a method for controlling a navigation system when the computer program is executed on a data processing system, the method comprising:

inputting an indication of a destination location to a mobile computer unit;

monitoring the current location of the mobile computer unit;

outputting a suggested route for reaching the destination location from the current location along a route selected on a predefined map, wherein the suggested route is determined by the mobile computer unit and takes into consideration traffic data stored on the mobile computer unit;

monitoring at the mobile computer unit, deviations from the suggested route;

building in the mobile computer unit, a repository of historical information about the deviations; and using the historical information about the deviations in the mobile computer unit to improve the traffic data stored on the mobile computer unit.

8. The computer program product according to claim 7, wherein the determination of the suggested route includes comparing the number of times a deviation from the suggested route was taken with the number of times the suggested route was taken.

9. The computer program product according to claim 8, wherein the traffic data stored on the mobile computer unit is updated when the number of times a deviation from the suggested route was taken exceeds a predetermined threshold.

10. The computer program product according to claim 7, wherein the step of outputting the suggested route for reaching the destination location includes the additional step of considering one or more predetermined user preferences.

11. The computer program product according to claim 7, further comprising:

providing, responsive to a number of the deviations in historical information exceeding a threshold, an alternative route that includes the deviation from the suggested route; and allowing a selection between the alternative route and the suggested route.

12. The computer program product of claim 7, wherein the mobile computer unit is coupled with a vehicle, wherein the suggested route is further determined by taking into consideration that traffic data stored on the mobile computer unit which is relevant to a type of the vehicle, and wherein using the historical information about the deviations improves the traffic data stored on the mobile computer unit for the type of the vehicle.

13. A mobile computer unit for a navigation system, the mobile computer unit comprising:

a data storage device including a storage medium, wherein the data storage device stores computer usable code, the computer usable code comprising:

computer usable code for inputting an indication of a destination location to the mobile computer unit;

computer usable code for storing traffic data;

computer usable code for calculating a suggested route for reaching the destination location from a current location along a route selected on a predefined map, wherein the suggested route is calculated by the mobile computer unit and takes into consideration traffic data stored on the mobile computer unit;

computer usable code for outputting the suggested route;

computer usable code for monitoring at the mobile computer unit, deviations from the suggested route;

computer usable code for building in the mobile computer unit, a repository of historical information about the deviations; and computer usable code for improving the traffic data using the historical information about the deviations in the mobile computer unit.

14. The mobile computer unit according to claim 13, wherein the determination of the suggested route includes comparing the number of times a deviation from the suggested route was taken with the number of times the suggested route was taken.

15. The mobile computer unit according to claim 14, wherein the traffic data stored on the mobile computer unit is updated when the number of times a deviation from the suggested route was taken exceeds a predetermined threshold.

16. The mobile computer unit according to claim 13, wherein the step of outputting the suggested route for reaching the destination location includes the additional step of considering one or more predetermined user preferences.

17. The mobile computer unit according to claim 13, further comprising:

computer usable code for providing, responsive to a number of the deviations in historical information exceeding a threshold, an alternative route that includes the deviation from the suggested route; and computer usable code for allowing a selection between the alternative route and the suggested route.

18. The mobile computer unit of claim 13, wherein the mobile computer unit is coupled with a vehicle, wherein the suggested route is further determined by taking into consideration that traffic data stored on the mobile computer unit which is relevant to a type of the vehicle, and wherein using the historical information about the deviations improves the traffic data stored on the mobile computer unit for the type of the vehicle.

19. An apparatus for a navigation system, the apparatus comprising:

means for inputting an indication of a destination location to a mobile computer unit;

means for storing traffic data;

means for calculating a suggested route for reaching the destination location from a current location along a route selected on a predefined map, wherein the suggested route is calculated by the mobile computer unit and takes into consideration traffic data stored on the mobile computer unit;

means for outputting the suggested route;

means for monitoring at the mobile computer unit, deviations from the suggested route;

means for building in the mobile computer unit, a repository of historical information about the deviations; and means for improving the traffic data using the historical information about the deviations in the mobile computer unit.

* * * * *